(12) United States Patent
Kim et al.

(10) Patent No.: US 10,286,967 B2
(45) Date of Patent: *May 14, 2019

(54) PREBUCK UNIT FOR VEHICLE BODY ASSEMBLING SYSTEM

(71) Applicants: Hyundai Motor Company, Seoul (KR); Kia Motors Corporation, Seoul (KR)

(72) Inventors: Sugil Kim, Changwon-si (KR); Sekyu Kang, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

This patent is subject to a terminal disclaimer.

(21) Appl. No.: 15/645,249

(22) Filed: Jul. 10, 2017

(65) Prior Publication Data

US 2018/0162470 A1 Jun. 14, 2018

(30) Foreign Application Priority Data

Dec. 13, 2016 (KR) .......................... 10-2016-0169842

(51) Int. Cl.
*B23K 37/04* (2006.01)
*B62D 65/02* (2006.01)
(Continued)

(52) U.S. Cl.
CPC .......... *B62D 65/026* (2013.01); *B23K 11/002* (2013.01); *B23K 11/11* (2013.01);
(Continued)

(58) Field of Classification Search
CPC .... B62D 65/026; B62D 65/02; B62D 65/022; B62D 65/00–18; B23K 11/11;
(Continued)

(56) References Cited

U.S. PATENT DOCUMENTS 5,150,506 A * 9/1992 Kotake ................. B62D 65/02
29/407.05
5,267,683 A * 12/1993 Hamada ............ B23K 37/0235
228/4.1
(Continued)

FOREIGN PATENT DOCUMENTS

JP 4477913 B2 6/2010
JP 5297362 B2 9/2013
(Continued)

Primary Examiner — Kiley S Stoner
(74) Attorney, Agent, or Firm — Slater Matsil, LLP (57) ABSTRACT

A prebuck unit includes side hangers mounted on a handling robot at both sides of the transport path and restricting lower parts of side assemblies. A guide post is fixedly installed in a prebuck frame at both sides of the transport path in a vehicle body height direction. The guide post is coupled with the side hanger so as to restrict the side assembly in a transverse direction and is configured to regularly position the side hanger at both sides of the floor assembly. A welding robot is installed at both sides of the transport path and is configured to weld the lower part of the side assembly and the floor assembly.

20 Claims, 9 Drawing Sheets

(51) Int. Cl.
*B23K 31/02* (2006.01)
*B23K 11/00* (2006.01)
*B23K 11/11* (2006.01)
*B23K 101/00* (2006.01)

(52) U.S. Cl.
CPC .......... *B23K 31/02* (2013.01); *B23K 37/0435* (2013.01); *B23K 37/0443* (2013.01); *B62D 65/02* (2013.01); *B62D 65/022* (2013.01); *B23K 2101/006* (2018.08)

(58) Field of Classification Search
CPC ............. B23K 11/002; B23K 37/0443; B23K 37/0435; B23K 31/02; B23K 2101/006; B23K 37/02–047; B23K 11/314; B23K 26/0884; B23K 37/0258; B23K 37/0217; B23K 37/0452; B60Y 2304/05; B60Y 2410/124; B60Y 2304/03; B60Y 2304/07
USPC ................. 228/44.3, 47.1, 49.1, 49.4, 49.6
See application file for complete search history.

(56) References Cited

U.S. PATENT DOCUMENTS

| | | | | |
|---|---|---|---|---|
| 6,059,169 A | * | 5/2000 | Nihei | B23K 11/314 228/44.3 |
| 2002/0087270 A1 | * | 7/2002 | Kim | B25J 9/1697 701/301 |
| 2008/0105733 A1 | * | 5/2008 | Monti | B62D 65/02 228/178 |
| 2012/0110838 A1 | * | 5/2012 | Kang | B61B 13/127 29/824 |
| 2012/0137490 A1 | * | 6/2012 | Kweon | B23K 31/02 29/428 |
| 2012/0145514 A1 | * | 6/2012 | Magni | B62D 65/02 198/345.1 |
| 2012/0304446 A1 | * | 12/2012 | Kilibarda | B23P 21/004 29/430 |
| 2013/0140749 A1 | * | 6/2013 | Jang | B25B 5/006 269/55 |
| 2013/0145616 A1 | | 6/2013 | Jang | |
| 2015/0034703 A1 | | 2/2015 | Tanaka et al. | |
| 2017/0028495 A1 | * | 2/2017 | Jin | B23K 37/047 |
| 2017/0028512 A1 | * | 2/2017 | Jin | B23K 1/0056 |
| 2017/0029052 A1 | * | 2/2017 | Jin | B23K 1/0056 |
| 2017/0029053 A1 | * | 2/2017 | Ishitsuka | B62D 65/022 |
| 2018/0043475 A1 | * | 2/2018 | Lee | B23K 31/02 |
| 2018/0065693 A1 | * | 3/2018 | Lee | B62D 65/022 |
| 2018/0065694 A1 | * | 3/2018 | Lee | B62D 65/18 |

FOREIGN PATENT DOCUMENTS

| | | |
|---|---|---|
| JP | 2015027838 A | 2/2015 |
| KR | 100887970 B1 | 3/2009 |
| KR | 100897267 B1 | 5/2009 |
| KR | 101326816 B1 | 11/2013 |
| KR | 101806963 B1 | 12/2017 |

\* cited by examiner

PREBUCK UNIT FOR VEHICLE BODY ASSEMBLING SYSTEM

CROSS-REFERENCE TO RELATED APPLICATIONS

This application claims priority to and the benefit of Korean Patent Application No. 10-2016-0169842 filed in the Korean Intellectual Property Office on Dec. 13, 2016, the entire contents of which are incorporated herein by reference.

TECHNICAL FIELD

An exemplar embodiment of the present invention relates to a vehicle body assembling system.

BACKGROUND

In general, a vehicle body a vehicle body passes through a process that assemblies various product panels produced in a vehicle body sub process to have a body in white (B.I.W) shape.

The vehicle body is constituted by components including a floor panel supporting driving units such as an engine and an axle and seats in a lower part of a frame, both side panels forming left and right sides of the frame, a roof panel forming the top of the frame, other multiple cowl panels, a roof rail, a package tray, and a back panel. The vehicle body components are assembled in a process (also referred to as a body build-up process in the art) called a main buck.

In the main buck process, the back panel is attached to the floor panel and thereafter, the both side panels, the cowl panel, the roof rail, the packet tray, and the roof panel are welded and assembled through a vehicle body assembling system.

For example, the vehicle body system restricts the side panels through a side hanger and a side gate and sets the side panels in the floor panel, sets the cowl panel, the roof rail, and the packet tray in the side panels and thereafter, welds attachment portions of the components through a welding robot.

The vehicle body assembling system in the related art includes a rotary index (also generally referred to as a '4-plane rotator" in the art) in which side gates for each vehicle type are installed on 4 planes, respectively. The 4-plane rotary index may rotate while restricting the side panel for each vehicle type through each side gate and set the side panels of the corresponding vehicle type at both sides of the floor panel at regular locations.

In the related art, since a whole frame of the vehicle body is restricted at once through the side gate for each vehicle type of the 4-plane rotary index, the weight and the size of the whole vehicle body assembling system cannot but increase.

Further, in the related art, since the side gate for each vehicle type is installed on each plane of the 4-plane rotary index, a large-weight huge facility needs to be additionally installed in order to assemble the vehicle bodies of five vehicle types or more.

Korean Patent Registration No. 1326816 (Registered on Nov. 1, 2013) discloses subject matter that is related to subject matter disclosed herein.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to a vehicle body assembling system, and particular embodiments relate to a prebuck unit for a vehicle body assembling system, which is capable of coping with vehicle body assembling of various types in a main buck process of a vehicle body assembling line The present invention has been made in an effort to provide a prebuck unit for a vehicle body assembling system, which separates a vehicle body assembling process into two processes to assemble vehicle bodies of at least 5 vehicle types or more and achieve weight lightening of a whole facility, unlike forming a frame of the vehicle body by a single process.

An exemplary embodiment of the present invention provides a prebuck unit for a vehicle body assembling system having a prebuck section and a main-buck section set along a transport path of a floor assembly, which is configured in a prebuck section. The pre-buck unit comprises i) side hangers mounted on a handling robot at both sides of the transport path and restricting lower parts of side assemblies, ii) a guide post fixedly installed in a prebuck frame at both sides of the transport path in a vehicle body height direction, coupled with the side hanger restricting the side assembly in a transverse direction, and regularly positioning the side hanger at both sides of the floor assembly, and iii) at least one welding robot installed at both sides of the transport path and welding the lower part of the side assembly and the floor assembly.

The prebuck unit may further include a robot hanger restricting the side assembly transported to the prebuck section through a transport hanger and loading the side assembly to the side hanger.

The side hanger may be coupled with the guide post through the handling robot.

A coupling direction of the side hanger and the guide post may be the transverse direction as a vehicle width direction which is the same as the coupling direction of the floor assembly and the side assembly.

The side hanger may include a hanger frame mounted on a front end of an arm of the handling robot, at least one reference pin installed in the hanger frame and fitted in a reference hole of the side assembly, and a plurality of first clampers installed in the hanger frame, clamping the lower of the side assembly and restricting a vehicle body transport direction and a height direction of the side assembly.

The first clampers may be disposed in the hanger frame in a triangular structure.

The side hanger may include rolling members rollably installed below both ends of the hanger frame, and guide pins installed on the tops of the rolling members to protrude in the transverse direction at both ends of the hanger frame.

The rolling member may include guide rollers rotatably installed below both ends of the hanger frame in the transverse direction.

The guide roller may be provided rotatably in the transverse direction while line-contacting the top of the guide post.

The guide roller may be provided rotatably in the transverse direction while point-contacting the top of the guide post.

The guide roller may have a rolling plane having a mountain shape, which point-contacts the top of the guide post.

The rolling member may include guide balls installed below both ends of the hanger frame to be rotatable omni-directionally.

The guide pin may have a tapered plane at a protruded portion thereof.

The guide post may include a pair of post frames installed on the prebuck frame to be spaced apart from each other and having guide rails guiding the rolling members formed on the top in the transverse direction.

Guide grooves coupled with the guide pins are formed at the ends of the guide rails in the post frame.

The guide rail may have a rail plane inclined toward the rail bottom at both sides.

The guide groove may have a pin coupling plane connected with the rail plane.

A plurality of second clampers for clamping a lowermost end of the side assembly is installed in the prebuck frame apart from the side hanger while the side hanger is coupled to the guide post.

The second clamper may be installed to reciprocate in 3-axis directions of the vehicle body transport direction, the vehicle body height direction, and the transverse direction by a driving unit.

Another exemplary embodiment of the present invention provides a prebuck unit for a vehicle body assembling system having a prebuck section and a main-buck section set along a transport path of a floor assembly, which is configured in a prebuck section. The pre-buck unit comprises side hangers mounted on a front end of an arm of a handling robot at both sides of the transport path and restricting lower parts of side assemblies, ii) a floating unit installed at the front end of the arm of the handling robot and provided to move in a vehicle body transport direction and a height direction, iii) a guide post fixedly installed in a prebuck frame at both sides of the transport path in a vehicle body height direction, coupled with the side hanger restricting the side assembly in a transverse direction, and regularly positioning the side hanger at both sides of the floor assembly, and iv) at least one welding robot installed at both sides of the transport path and welding the lower part of the side assembly and the floor assembly.

The floating unit may include a first mounting plate mounted at the front end of the arm of the handling robot, a first floating plate coupled to the first mounting plate, a second mounting p late coupled with the side hanger, a second floating plate coupled to the second mounting plate, and a third floating plate disposed between the first floating plate and the second floating plate and coupled to the first and second floating plates.

The first and third floating plates may be provided to move in the vehicle body transport direction through the second floating plate.

The second and third floating plate may be provided to move in the vehicle body height direction through the first floating plate.

The floating unit may include a first stopper installed in the first and third floating plates and restricting vehicle body height-direction movement ranges of the second and third floating plates.

The floating unit may include a second stopper installed in the second and third floating plates and restricting vehicle body transport-direction movement ranges of the first and third floating plates.

The floating unit may include a locking cylinder having a locking pin installed in the first floating plate to move in the transverse direction through air pressure between the first and third floating plates and selectively coupling the locking pin to a pin hole at the center of the third floating plate.

DETAILED DESCRIPTION OF ILLUSTRATIVE EMBODIMENTS

The present invention will be described more fully hereinafter with reference to the accompanying drawings, in which exemplary embodiments of the invention are shown.

Figure 1:
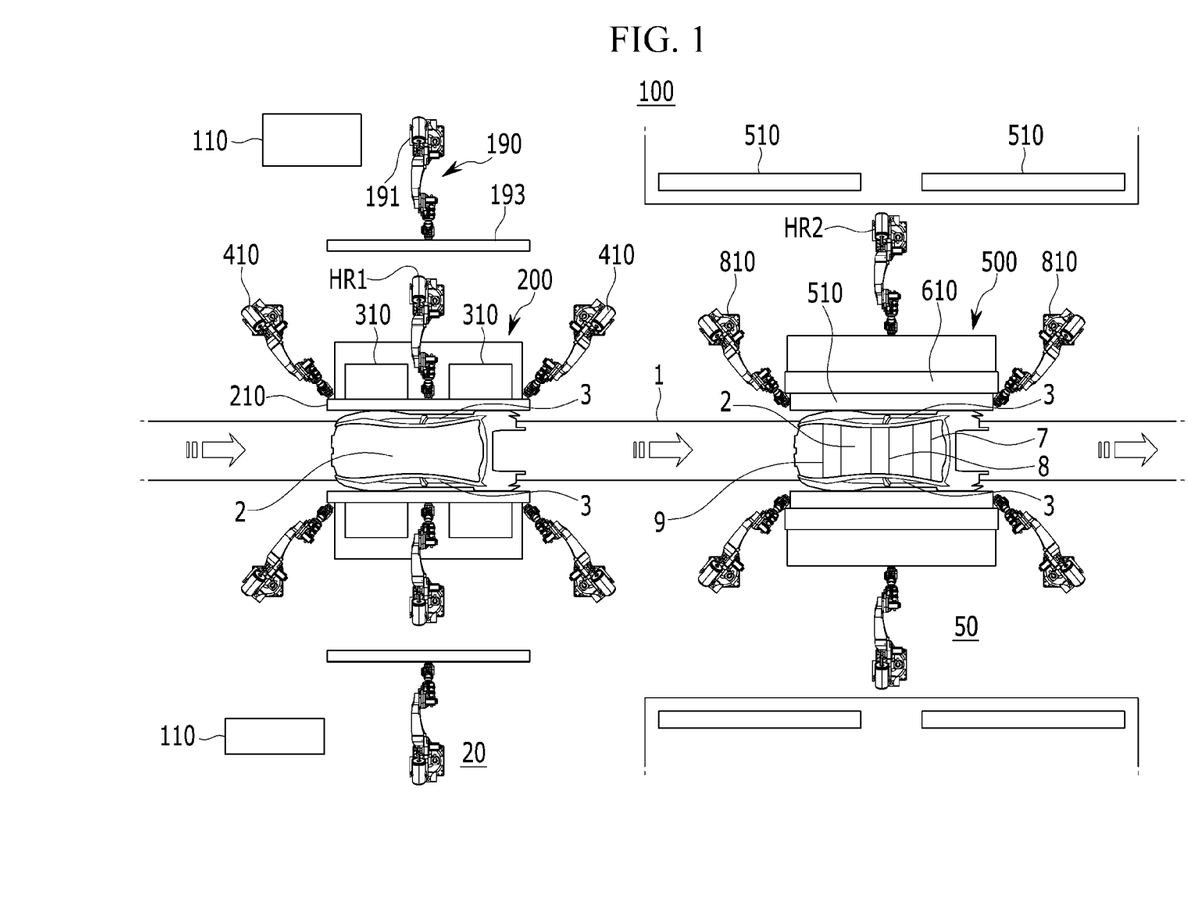
FIGS. 1 and 2 are block diagrams schematically illustrating a vehicle body assembling system according to an exemplary embodiment of the present invention.
Figure 2:
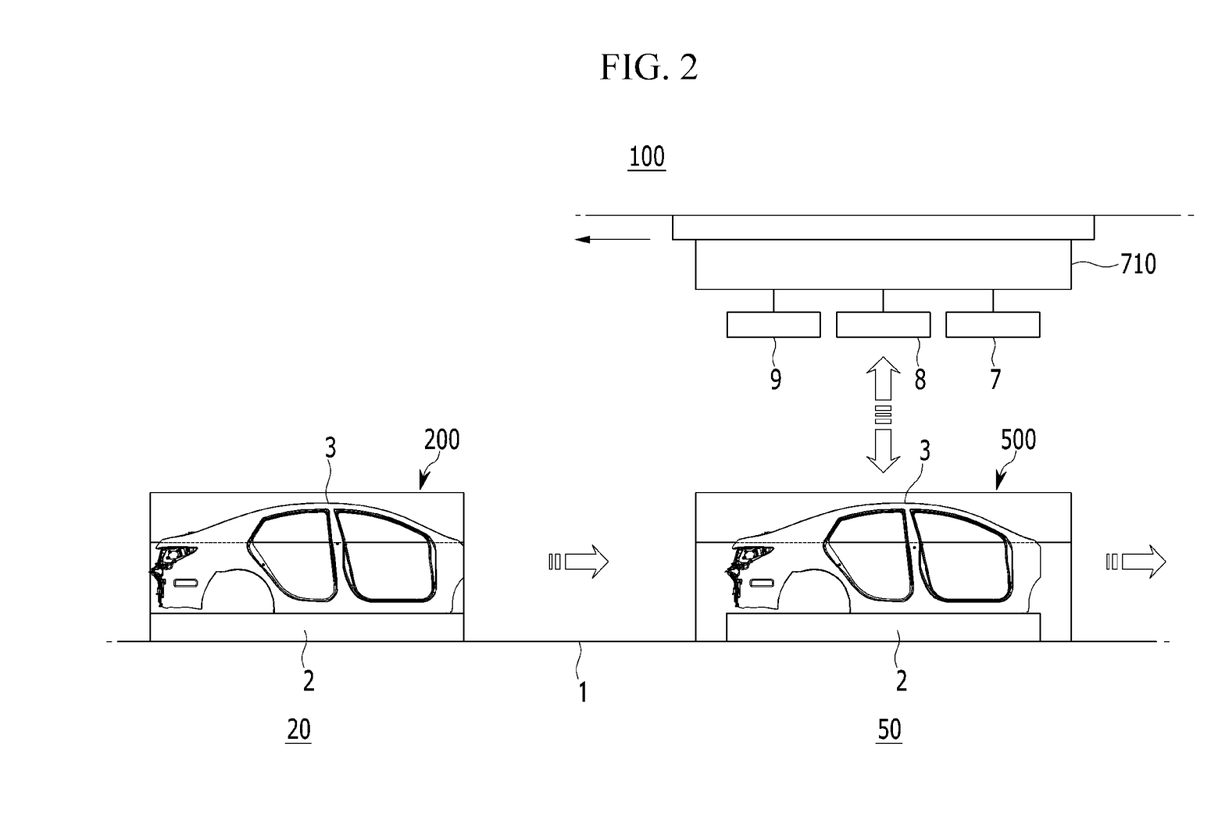

FIGS. 1 and 2 are block diagrams schematically illustrating a vehicle body assembling system according to an exemplary embodiment of the present invention.

Referring to FIGS. 1 and 2, the vehicle body assembling system 100 according to the exemplary embodiment of the present invention may be applied to a vehicle body assembling line that restricts and welds vehicle body assembly components transported on the vehicle body assembling line and assembles the vehicle body assembly components as one completed vehicle body.

The vehicle body assembling line includes a main process that assembles a floor assembly which becomes a base of a vehicle body, a side process that assemblies side assemblies which are wall components of the vehicle body, and a main buck process that assemblies the side assembly to the floor assembly and a cowl, a roof rail, and a package tray to the side assembly.

Herein, the main buck process is a process that fixes a welding fixture through a large-sized apparatus and integrally assemblies a side body assembly and an under body while swing, rotating, and shifting the welding fixture.

The vehicle body assembling system 100 according to the exemplary embodiment of the present invention may be applied to the main buck process that assemblies the floor assembly left and right side assemblies, the cowl, the roof rail, and the package tray with a spot welding facility by a robot in the vehicle body assembling line.

Hereinafter, an example in which the side assemblies are attached to both sides of the floor assembly based on the floor assembly and the cowl, the roof rail, and the package tray are attached to the side assemblies in the main buck process will be described.

That is, the vehicle body assembling system 100 according to the exemplary embodiment of the present invention may assemble side assemblies 3 to both sides of a floor assembly 2 based on the floor assembly 2 transported along a transport path set through a cart line 1 and assemble a cowl 7, a roof rail 8, and a package tray 9 to the side assemblies 3.

In the exemplary embodiment of the present invention, a transport direction of the floor assembly 2 is defined as a vehicle body transport direction and in the art, the vehicle body transport direction is referred to as a T direction, a vehicle width direction is referred to as an L direction, and a height direction of the vehicle body is referred to as an H direction. However, in the exemplary embodiment of the present invention, the L, T, and H directions are defined as the transport direction, the vehicle width direction, and the height direction of the vehicle body. In addition, in the exemplary embodiment of the present invention, the vehicle width direction is a direction in which the side assemblies 3 are coupled to both sides of the floor assembly 2 and hereinafter, the vehicle width direction is referred to as a transverse direction.

The vehicle body assembling system 100 according to the exemplary embodiment of the present invention separates a vehicle body assembling process into two processes to assemble vehicle bodies of at least 5 vehicle types or more and achieve weight lightening of a whole facility, unlike forming a frame of the vehicle body by a single process.

To this end, the vehicle body assembling system 100 according to the exemplary embodiment of the present invention sets a prebuck section 20 and a main-buck section 50 partitioned according to the transport path of the cart line 1.

In addition, the vehicle body assembling system 100 according to the exemplary embodiment of the present invention primarily includes a prebuck unit 200 configured in the prebuck section 20 and a main-buck unit 500 configured in the main-buck section 50.

The prebuck unit 200 and the main-buck unit 500 may be installed in one frame in the prebuck section 20 and the main-buck section 50 and installed in the respective partitioned frames.

The frame which is used for supporting the components includes affiliated components including various brackets, support blocks, plates, housings, covers, colors, and the like. However, since the affiliated components are used for installing the respective components in the frame, the affiliated components are integrally called the frame except for an exceptional case in the exemplary embodiment of the present invention.

Figure 3:
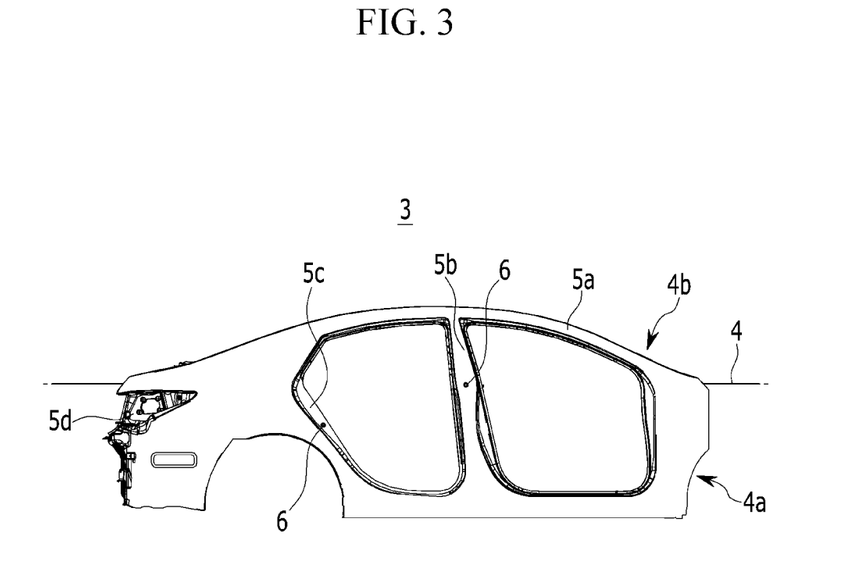
FIG. 3 is a diagram illustrating a side assembly applied to the vehicle body assembling system according to the exemplary embodiment of the present invention.

Meanwhile, in the exemplary embodiment of the present invention, the side assembly 3 may be divided into a lower part 4a and an upper part 4b based on a dotted reference line 4 as illustrated in FIG. 3. In addition, the side assembly 3 has a front pillar 5a, a center pillar 5b, a rear pillar 5c, and a rear combination lamp unit 5d. Furthermore, at least one reference hole 6 for restricting a regular location of the side assembly 3 is formed in the side assembly 3.

In the exemplary embodiment of the present invention, the prebuck unit 200 is used for restricting the lower parts 4a of the side assemblies 3 which are different for each vehicle type with respect to both sides of the floor assembly 2 and pre-assembling the lower parts 4a to the floor assemblies 2. The prebuck unit 200 is configured at each of both sides of the transport path of the cart line 1 in the prebuck section 20.

In addition, in the exemplary embodiment of the present invention, the main-buck unit 500 is used for post-assembling vehicle body components to the side assembly 3 of the vehicle body transported to the main-buck section 50 through the cart line 1 while the lower part 4a of the side assembly 3 is pre-assembled to the floor assembly 2 by the prebuck unit 200 in the prebuck section 20.

That is, the main-buck unit 500 is used for restricting the upper part 4b of the side assembly 3 in the main-buck section 50 and assembling the vehicle body components to the upper part 4b of the side assembly 3. Herein, the vehicle body components may include the cowl 7, the roof rail 8, and the package tray 9.

The main-buck unit 500 is configured at each of both sides of the transport path of the cart line 1 in the prebuck section 50. The main-buck unit 500 includes a side jig 510, a rotary index 610, a CRP loading unit 710, and a welding robot 810 (hereinafter, referred to as a "second welding robot") for restricting the vehicle width direction (transverse direction) of the side assembly 3 and post-assembling the vehicle body components to the upper part 4b of the side assembly 3.

Hereinafter, only a configuration of the prebuck unit 200 associated with the exemplary embodiment of the present invention will be described and a detailed description of the configuration of the main-buck unit 500 will be omitted.

Figure 4:
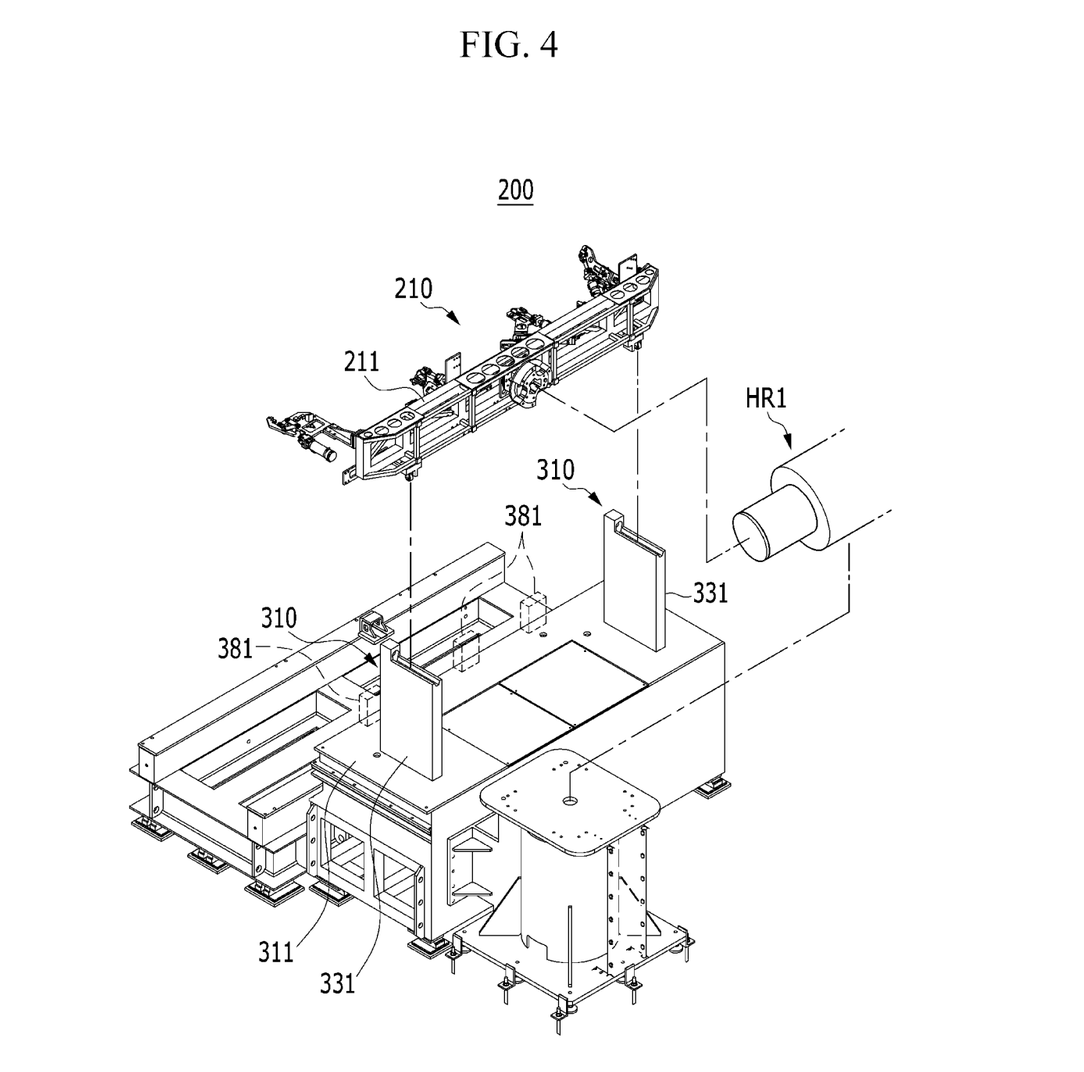
FIG. 4 is a perspective view illustrating a prebuck unit applied to the vehicle body assembling system according to the exemplary embodiment of the present invention.

FIG. 4 is a perspective view illustrating a prebuck unit applied to the vehicle body assembling system according to the exemplary embodiment of the present invention.

Referring to FIGS. 1 and 4, the prebuck unit 200 according to the exemplary embodiment of the present invention includes a side hanger 210, a guide post 310, and a plurality of first welding robots 410 for restricting the transport direction and the height direction of the vehicle body of the side assembly 3 and pre-assembling the lower part 4a (hereinafter, see FIG. 3) of the side assembly 3 to the floor assembly 2.

Herein, the pre-assembling means not setting assembly that positions a side complete-type side assembly 3 the floor assembly 2 of the vehicle body but weld-assembling the lower part of the side assembly 3 to the floor assembly 2.

In the exemplary embodiment of the present invention, the side hanger 210 is used for clamping or gripping the lower parts 4a of the side assemblies 3 different for each vehicle type and restricting the transport direction and the height direction of the vehicle body of the side assembly 3.

A plurality of side hangers 210 are provided to correspond to the side assemblies 3 different for each vehicle type, respectively. In addition, the side hanger 210 may be provided to be mounted on a first handling robot HR1 in the prebuck section 20 and be replaceably detached from/attached to a front end of an arm of the first handling robot HR1.

As the plurality of side hangers 210 are provided to correspond to the side assemblies 3 different for each vehicle type, the prebuck section 20 includes a storage unit (not illustrated) for storing the side hangers 210. The storage unit is configured at both sides of the transport path of the cart line 1 in the prebuck section 20.

As described above, the side hangers 210 stored in the storage unit may be replaceably detached from/attached to the front end of the arm of the first handling robot HR1 according to the side assemblies 3 different for each vehicle type.

Meanwhile, the side hanger 210 may restrict the lower parts 4a of the side assemblies 3 aligned at a predetermine location in the prebuck section 20. To this end, the prebuck unit 200 according to the exemplary embodiment of the present invention includes a robot hanger 190 illustrated in FIG. 1.

The robot hanger 190 may restrict the side assembly 3 transported to the prebuck section 20 through a transport hanger 110 and load the side assembly 3 to the side hanger 210 by a robot-to-robot scheme.

The robot hanger 190 includes a common jig 193 mounted on the front end of the arm of the hanger robot 191. The common jig 193 is used for commonly aligning and restricting the side assemblies 3 different for each vehicle type to a predetermined location. The robot hanger 190 may sets a reference location of the side assembly 3, support an edge of the side assembly 3, and clamp the edge. Since the common jig 193 is configured by a jig device of prior art which is widely known in the art, a more detailed description of the common jig will be omitted in the present specification.

Figure 5:
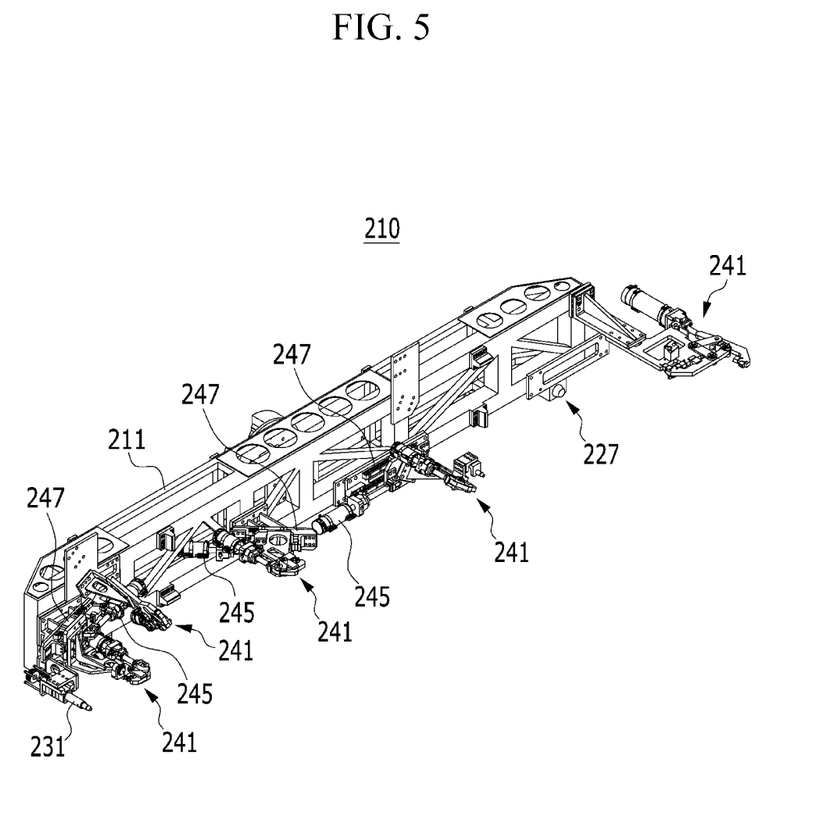
FIG. 5 is a perspective view illustrating a side hanger applied to the prebuck unit for the vehicle body assembling system according to the exemplary embodiment of the present invention.

FIG. 5 is a perspective view illustrating a side hanger applied to the prebuck unit of the vehicle body assembling system according to the exemplary embodiment of the present invention.

Referring to FIGS. 4 and 5, the side hanger 210 according to the exemplary embodiment of the present invention primarily includes a hanger frame 211, a reference pin 231, and a first clamper 241.

The hanger frame 211 is mounted on the front end of the arm of the first handling robot HR1 (hereinafter, see FIG. 1) positioned in the prebuck section 20 (hereinafter, see FIG. 1). The hanger frame 211 may be mounted on the front end of the arm of the first handling robot HR1 through a tool changer (not illustrated) provided at the front end of the arm of the first handling robot HR1 or separated from the front end of the arm.

The reference pin 231 which sets the reference location of the side assembly 3 is installed in the hanger frame 211 as at least one number. The reference pin 231 fits in the reference hole 6 of the side assembly 3 illustrated in FIG. 3.

The reference pin 231 may move in an anteroposterior direction on a front surface of the hanger frame 211 through a driving means of the reference pin 231 and fit in the reference hole 6 of the side assembly 3. Furthermore, the reference pin 231 may be configured to be position-variable in 3-axis directions of the vehicle body transport direction, the vehicle body height direction, and the transverse direction by the driving means to correspond to the reference hole 6 of the side assembly 3 different for each vehicle type.

The first clamper 241 clamps only the lower part 4a of the side assembly 3 and restricts the transport direction and the height direction of the vehicle body of the side assembly 3 and a plurality of hanger frames 211 is installed in the hanger frame 211.

The first clamper 241 is installed at each of both ends of the hanger frame 211 and a plurality of first clampers 241 is installed between both ends. The first clampers 241 provided at both ends of the hanger frame 211 may clamp a front side and a rear side (the rear combination lamp unit) of the side assembly 3. The first clampers 241 at both ends of the hanger frame 211 are fixedly provided at both ends.

In addition, the plurality of first clampers 241 provided between both ends of the hanger frame 211 may clamp the front pillar 5a, the center pillar 5b, and the rear pillar 5c of the side assembly 3 illustrated in FIG. 3.

Herein, the first clampers 241 corresponding to the front pillar 5a, the center pillar 5b, and the rear pillar 5c of the side assembly 3 may be installed to reciprocate in the vehicle body transport direction to be position-variable by a driving unit 243.

The driving unit 243 is used for moving the first clampers 241 in the vehicle body transport direction according to the location of a pillar part of the side assembly 3. For example, the driving unit 243 may reciprocate the first clamper 241 in the vehicle body transport direction through a guide structure 247 in the related art, which guides a linear motion of an operating cylinder 245.

The first clampers 241 of the side hanger 210 may be installed in the hanger frame 211 in a triangular structure so as to stably grip the lower part of the side assembly 3 based on the center of the side assembly 3.

Figure 6:
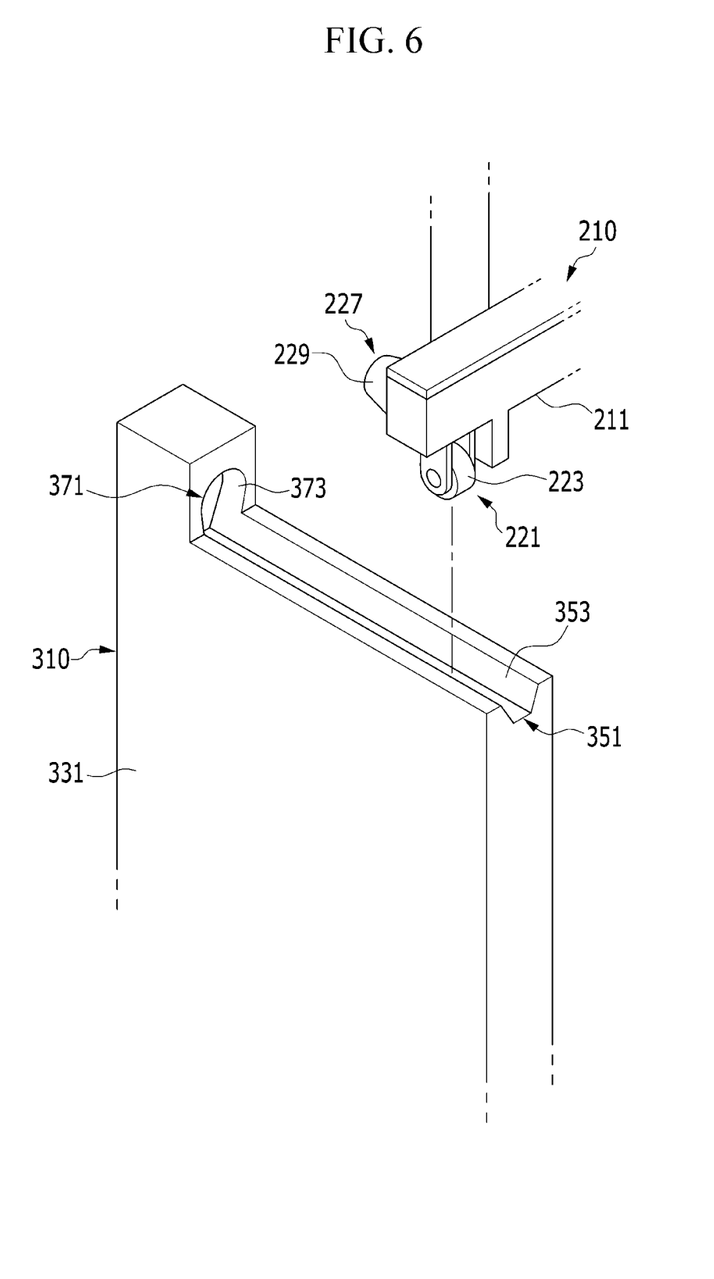
FIG. 6 is a diagram illustrating a rolling member and a guide pin of the side hanger applied to the prebuck unit for the vehicle body assembling system according to the exemplary embodiment of the present invention.

Meanwhile, in the exemplary embodiment of the present invention, the side hanger 210 may further include a rolling member 221 and a guide pin 227 installed in the hanger frame 211 as illustrated in FIG. 6.

The rolling member 221 and the guide pin 227 are used for coupling the hanger frame 211 that restricts the lower part 4a of the side assembly 3 through the first clampers 241 to a guide post 310 to be further described later.

In detail, the rolling member 221 and the guide pin 227 are used for moving the hanger frame 211 that restricts the side assembly 3 through the first clampers 241 to both sides of the floor assembly 2 along the guide post 310 through the first handling robot HR1 in the transverse direction and coupling the moved hanger frame 211 to the guide post 310.

Herein, the side assemblies 3 restricted by the hanger frame 211 through the first clamper 241 are coupled with the hanger frame 211 and the guide post 310 and matching-coupled to both sides of the floor assembly 2 (hereinafter, see FIG. 1). In addition, a coupling direction of the hanger frame 211 and the guide post 310 means the transverse direction as the vehicle width direction which is the same as the coupling direction of the floor assembly 2 and the side assembly 3.

When the hanger frame 211 moves in the transverse direction to both sides of the floor assembly 2 along the guide post 310 through the first handling robot HR1, the rolling member 221 rotates while supporting the guide post 310.

The rolling member 221 is rollably installed below each of both ends of the hanger frame 211. The rolling member 221 may include a guide roller 223 which rotates in the transverse direction while contacting the guide post 310. The guide roller 223 is provided to rotate in the transverse direction while line-contacting the guide post 310, as one example.

Figure 7:
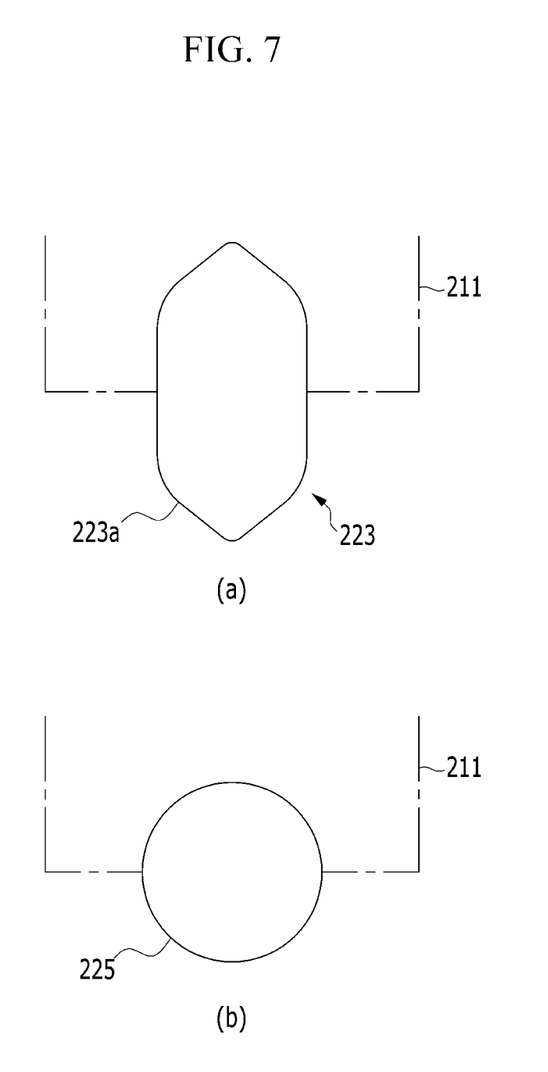
FIG. 7 is a diagram illustrating other examples of the rolling member in the side hanger applied to the prebuck unit for the vehicle body assembling system according to the exemplary embodiment of the present invention.

As another example, the guide roller 223 may be provided to rotate in the transverse direction while point-contacting the guide post 310 as illustrated in FIG. 7A. Herein, the guide roller 223 has a rolling plane 223a having a mountain shape, which point-contacts the guide post 310.

Alternatively, the rolling member 221 does not particularly include the guide roller 223, but as illustrated in FIG. 7B, the rolling member 221 may include a guide ball 225 installed below each of both ends of the hanger frame 211 to be rotatable omnidirectionally.

The guide pin 227 is installed to protrude on the top of the rolling member 221 in the transverse direction at each of both ends of the hanger frame 211 as illustrated in FIG. 6. The guide pin 227 is used for coupling the hanger frame 211 which moves with a predetermined distance along the guide post to the guide post 310. A tapered plane 229 is formed at a protruded portion of the guide pin 227.

Herein, the predetermined distance is a distance from a contact start portion of the rolling member 221 to the guide post 310 up to a coupling portion of the guide pin 227 to the guide post 310. That is, the predetermined distance means a distance between contact start portion of the rolling member 221 to the guide post 310 and both the side assembly 3 restricted by the hanger frame 211 and the floor assembly 2 to which the side assembly 3 is to be matching-coupled.

A coupling structure of the rolling member 221 and the guide pin 227, and the guide post 310 will be described below in more detail.

Referring to the disclosed drawings and FIGS. 4 and 6, the guide post 310 according to the exemplary embodiment of the present invention is coupled with the side hanger 210 that restricts the side assembly 3 in the transverse direction in the prebuck section 20 and is used for setting the side assembly 3 at a regular location of each of both sides of the floor assembly 2.

Furthermore, the guide post 310 according to the exemplary embodiment of the present invention is used for removing a location distribution of the side assembly 3, which may occur while the first handling robot HR1 handles the side hanger 210 that restricts the side assembly 3 and minimizing an assembly distribution of the side assembly 3 to each of both sides of the floor assembly 2.

The guide post 310 is disposed at each of both sides of the transport path of the cart line 1 (hereinafter, see FIG. 1) in the prebuck section 20 and coupled with the hanger frame 211 of the side hanger 210 through the first handling robot HR1 in the transverse direction.

The guide post 310 is fixedly installed in the prebuck frame 311 in the vehicle body height direction at both sides of the transport path of the prebuck section 20. The guide post 310 includes a pair of post frames 331.

The post frames 331 are substantially coupled with the hanger frame 211 of the side hanger 210 through the first handling robot HR1, disposed in the prebuck frame 311 to be spaced apart from each other in the vehicle body transport direction, and fixed onto the top of the prebuck frame 311 in the vehicle body height direction. A guide rail 351 and a guide groove 371 for guiding the hanger frame 211 are formed on the top of the post frame 331.

The guide rail 351 which guides the rolling member 221 of the side anger 210 in the transverse direction is formed on the top of the post frame 331 in a groove shape in the transverse direction. The guide rail 351 has rail planes 353 inclined toward a rail bottom at both sides thereof.

In addition, the guide groove 371 is formed at the end of the guide rail 351 on the top of the post frame 331 and coupled with the guide pin 227 of the side hanger 210. The guide groove 371 is connected with the rail plane 353 of the guide rail 351 and has a pin coupling plane 373 coupled with the tapered plane 229 of the guide pin 227.

Meanwhile, as illustrated in FIG. 4, in the exemplary embodiment of the present invention, while the side hanger 210 that restricts the side assembly 3 is coupled to the post frame 331, the prebuck frame 311 further includes a plurality of second clampers 381 for clamping the lowermost end of the side assembly 3.

The second clampers 381 are disposed to be spaced apart from each other at a predetermined interval in the vehicle body transport direction apart from the side hanger 210. The second clamper 381 may clamp a lower side seal of the side assembly 3.

Herein, the second clamper 381 is schematically illustrated in FIG. 4, but the second clampers 381 may be installed to reciprocate in the 3-axis directions of the vehicle body transport direction, the vehicle body height direction, and the transverse direction by the driving unit (not illustrated) to correspond to the side assemblies 3 different for each vehicle type.

Referring to FIG. 1 disclosed above, the first welding robot 410 is used for welding the lower parts 4a of the side assemblies 3 regularly positioned at both sides of the floor assembly 2 by the side hanger 210 and the guide post 310 and the floor assembly 2.

The plurality of first welding robots 410 is installed in the vehicle body transport direction in the prebuck section 20 and has a structure in which a spot welding apparatus is mounted on the front end of the arm of the robot.

Since the first welding robot 410 is configured by a spot welding robot of the related art, which is widely known in the art, a more detailed description of the component will be omitted in the present specification.

Figure 8:
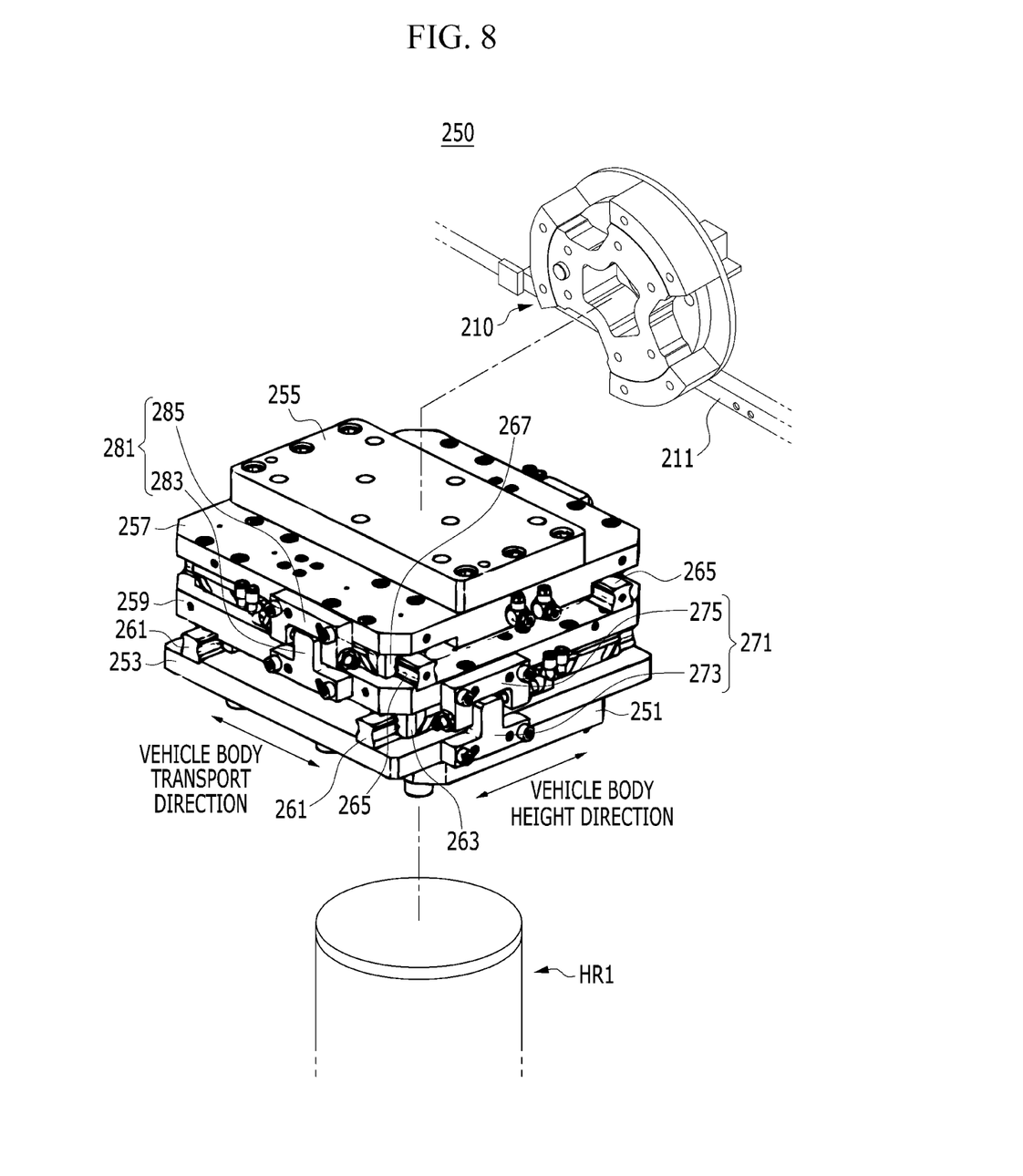
FIG. 8 is a perspective view illustrating a floating unit applied to the prebuck unit for the vehicle body assembling system according to the exemplary embodiment of the present invention.

FIG. 8 is a perspective view illustrating a floating unit applied to the prebuck unit for the vehicle body assembling system according to the exemplary embodiment of the present invention.

Referring to FIGS. 1 and 8, the prebuck unit 200 according to the exemplary embodiment of the present invention includes a floating unit 250 installed at the front end of the arm of the first handling robot HR1 and provided to move in the vehicle body transport direction and the vehicle body height direction.

The floating unit 250 is used for reducing a load applied to the first handling robot HR1 in XY-axis directions (the vehicle body transport direction and the vehicle body height direction) by the location distribution of the side hanger 210 when the side assembly 3 restricted by the robot hanger 190 is loaded to the side hanger 210 by the robot-to-robot scheme and when the side hanger 210 is coupled to the guide post 310.

The floating unit 250 includes a first mounting plate 251, a first floating plate 253, a second mounting plate 255, a second floating plate 257, and a third floating plate 259.

The first mounting plate 251 may be mounted on the front end of the arm of the first handling robot HR1. The first floating plate 253 is coupled to the first mounting plate 251. The second mounting plate 255 may be coupled with the hanger frame 211 of the side hanger 210. The second floating plate 257 is coupled to the second mounting plate 255. Herein, a tool changer (not illustrated) for coupling the hanger frame 211 may be installed on the second mounting plate 255.

The third floating plate 259 is disposed between the first floating plate 253 and the second floating plate 257 and coupled to the first and second floating plates 253 and 257 to move the vehicle transport direction and the vehicle body height direction.

When the coupling structure of the first to third floating plates 253, 257, and 259 is described, first rail members 261 are installed at both sides of one plane (the top in FIG. 8) of the first floating plate 253 in the vehicle body height direction and first sliders 263 slidably coupled with the first rail members 261 are installed at both sides of one plane (the bottom in FIG. 8) of the third floating plate 259.

In addition, second rail members 265 are installed at both sides of the other plane (the top in FIG. 8) of the third floating plate 259 and second sliders 267 slidably coupled with the second rail member 265 are installed at both sides of one plane (the bottom in FIG. 8) of the second floating plate 257.

Herein, the first mounting plate 251 is coupled to the other plane (the bottom in FIG. 8) of the first floating plate 253 and the second mounting plate 255 is coupled to the other plane (the top in FIG. 8) of the second floating plate 257.

In addition, when the first and second mounting plates 251 and 255 are in a free state, the first and third floating plates 253 and 259 are provided to move in the vehicle body transport direction by the second rail member 265 and the second slider 267 and the second and third floating plates 257 and 259 are provided to move in the vehicle body height direction by the first rail member 261 and the first slider 263.

In this case, the first floating plate 253 is coupled with the first mounting plate 251 and the first mounting plate 251 is mounted on the front end of the arm of the first handling robot HR1, and as a result, the first floating plate 253 may be regarded as a fixed member in the exemplary embodiment of the present invention. In addition, the second floating plate 257 is coupled with the second mounting plate 255 and the second mounting plate 255 is coupled with the hanger frame 211 of the side hanger 210, and as a result, the second and third floating plates 257 and 259 may be regarded as movable members in the exemplary embodiment of the present invention.

Therefore, when the first floating plate 253 is regarded as the fixed member and the second and third floating plates 257 and 259 are regarded as the movable members, the first and second floating plates 257 and 259 move in the vehicle body height direction and the second floating plate 257 moves in the vehicle body transport direction. Therefore, the hanger frame 211 of the side hanger 210 coupled to the second floating plate 257 through the second mounting plate 255 may move in the vehicle body transport direction and the vehicle body height direction.

Meanwhile, the floating unit 250 according to the exemplary embodiment of the present invention includes a first stopper 271 installed in the first and third floating plates 253 and 259 and a second stopper 281 installed in the second and third floating plates 257 and 259.

The first stopper 271 serves to limit vehicle body height-direction movement ranges of the second and third floating plates 257 and 259 when the first and second mounting plates 251 and 255 are in the free state. The first stopper 271 includes a first protrusion member 273 having a "凸" shape, which is installed at one side of the first floating plate 253 and a first groove member 275 having a "凹" shape, which is installed at one side of the third floating plate 259 and unevenly coupled with the first protrusion member 273 with a predetermined gap.

In addition, the second stopper 281 serves to limit vehicle body transport-direction movement ranges of the first and third floating plates 253 and 259 when the first and second mounting plates 251 and 255 are in the free state. The second stopper 281 includes a second protrusion member 283 having the "凸" shape, which is installed at one side of the third floating plate 259 and a second groove member 285 having the "凹" shape, which is installed at one side of the second floating plate 257 and unevenly coupled with the second protrusion member 283 with a predetermined gap.

Figure 9:
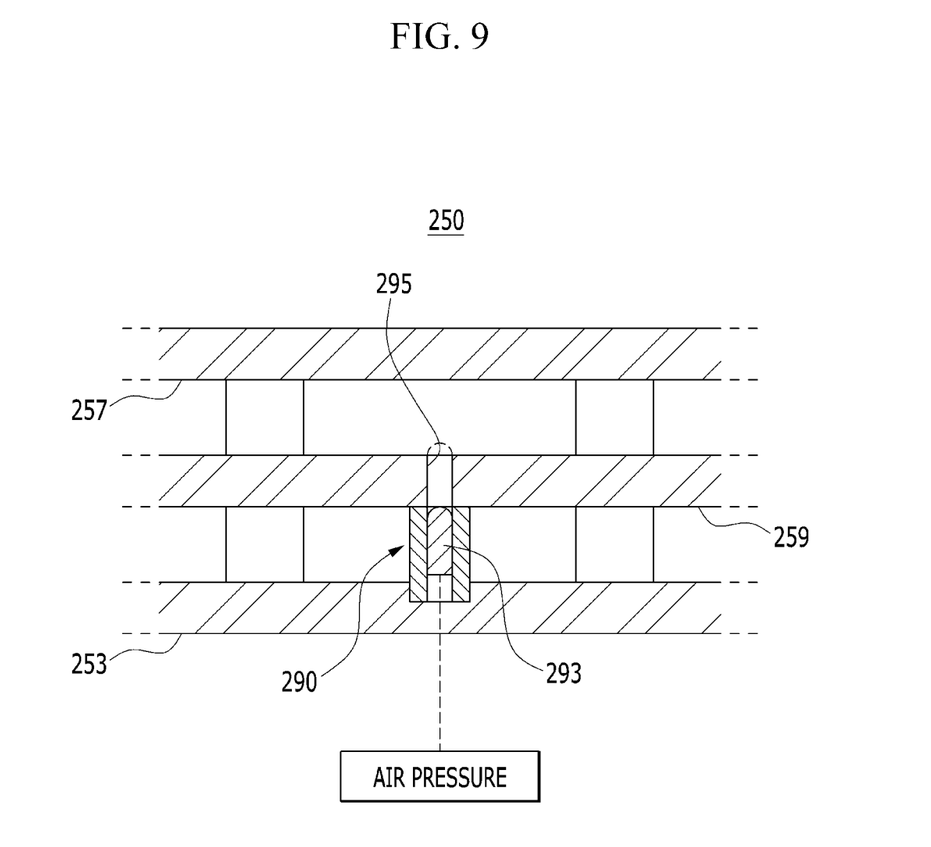
FIG. 9 is a diagram schematically a locking cylinder of the floating unit applied to the prebuck unit for the vehicle body assembling system according to the exemplary embodiment of the present invention.

Furthermore, the floating unit 250 according to the exemplary embodiment of the present invention includes a locking cylinder 290 for selectively locking and unlocking the movement of the second and third floating plates 257 and 259 as illustrated in FIG. 9 when the first floating plate 253 is considered as the fixed member.

Herein, the locking means a state of regularly setting the second and third floating plates 257 and 259 to an original location based on the first floating plate 253 and impeding the movement of the second and third floating plates 257 and 259. In addition, the unlocking means a state in which the second and third floating plates 257 and 259 are movable in the vehicle body transport direction and the vehicle body height direction based on the first floating plate 253.

The locking cylinder 290 is provided as a pneumatic cylinder and installed on one plane of the first floating plate 253 between the first and third floating plates 253 and 259. The locking cylinder 290 includes a locking pin 293 which moves in the transverse direction by air pressure. The locking pin 293 may be selectively coupled to a pin hole 295 at the center of the third floating plate 259 by the air pressure.

That is, when the locking pin 293 is released from the pin hole 295 of the third floating plate 259, the unlocking state may be maintained and when the locking pin 293 is coupled to the pin hole 295, the locking state may be maintained.

Hereinafter, the operation of the prebuck unit 200 for the vehicle body assembling system 100 according to the exemplary embodiment of the present invention, which is configured as above and an assembling process of the vehicle body will be described in detail with reference to the above-disclosed drawings.

First, in the exemplary embodiment of the present invention, the floor assembly 2 assembled in a sub assembling line is transported to the prebuck section 20 along a predetermined transport path through the cart line 1.

In the prebuck section 20, the side hanger 210 of the prebuck unit 200 is mounted on the front end of the arm of the first handling robot HR1.

Herein, the front end of the arm of the first handling robot HR1 is coupled with the first mounting plate 251 of the floating unit 250 and the side hanger 210 is coupled with the second mounting plate 255 of the floating unit 250 through the tool changer (not illustrated).

In such a state, the side assembly 3 is transported to the prebuck section 20 through the transport hanger 110 and in the exemplary embodiment of the present invention, the side assembly 3 is unloaded from the transport hanger 110 through the robot hanger 190.

The robot hanger 190 clamps the side assemblies 3 while aligning the side assemblies 3. In such a state, in the exemplary embodiment of the present invention, the side assembly 3 is loaded to the side hanger 210 through the robot hanger 190 by the robot-to-robot scheme.

When such a process is described in detail, first, the locking cylinder 290 of the floating unit 250 separates the locking pin 293 from the pin hole 295 of the third floating plate 259 by the air pressure.

Then, the floating unit 250 maintains the state (the unlocking state) in which the second and third floating plates 257 and 259 are movable in the vehicle body transport direction and the vehicle body height direction based on the first floating plate 253.

Then, in the exemplary embodiment of the present invention, the reference pin 231 of the side hanger 210 fits in the reference hole 6 of the side assembly 3 restricted by the robot hanger 190 through the first handling robot HR1.

In such a process, when the location distribution of the side hanger 210 occurs, the side hanger 210 may move in the vehicle body transport direction and the vehicle body height direction through the first to third floating plates 253, 257, and 259 of the first floating unit 250 and the load applied to the first handling robot HR1 in the vehicle body transport direction and the vehicle body height direction may be reduced in the exemplary embodiment of the present invention.

That is, in the exemplary embodiment of the present invention, when the load is applied to the reference pin 231 of the side hanger 210 which fits in the reference hole 6 of the side assembly 3 by the location distribution of the side hanger 210, the side hanger 210 may move in the vehicle body transport direction and the vehicle body height direction through the floating unit 250.

Herein, the second and third floating plates 257 and 259 moves in the vehicle body height direction by the first rail member 261 and the first slider 263 and the second floating plate 257 moves in the vehicle body transport direction by the second rail member 265 and the second slider 267.

Therefore, the side hanger 210 coupled to the second floating plate 257 through the second mounting plate 255 moves in the vehicle body transport direction and the vehicle body height direction. In this case, the vehicle body height-direction movement of the second and third floating plates 257 and 259 is restricted by the first stopper 271 and the vehicle body transport-direction movement of the second floating plate 257 is restricted by the second stopper 281.

Then, the robot hanger 190 releases the restriction of the side assembly 3 and returns to the original location. Thereafter, the locking cylinder 290 of the floating unit 250 couples the locking pin 293 to the pin hole 295 of the third floating plate 259 by the air pressure.

Then, in the exemplary embodiment of the present invention, the second and third floating plates 257 and 259 are regular set to the original location based on the first floating plate 253 and the movement of the second and third floating plates 257 and 259 is impeded. That is, the side hanger 210 returns to the original location before the movement by the floating unit 250.

While the reference location of the side assembly 3 is set in the side hanger 210, the lower part 4a of the side assembly 3 is clamped through the first clampers 241 of the side hanger 210 in the exemplary embodiment of the present invention.

In this case, the first clampers 241 provided at both ends of the hanger frame 211 of the side hanger 210 clamp the front side and the rear side (the rear combination lamp unit) of the side assembly 3.

In addition, the plurality of first clampers 241 provided between both ends of the hanger frame 211 clamp the front pillar 5a, the center pillar 5b, and the rear pillar 5c of the side assembly 3, respectively.

In this case, the plurality of first clampers 241 provided between both ends of the hanger frame 211 clamp the front pillar 5a, the center pillar 5b, and the rear pillar 5c of the side assembly 3, respectively while moving in the vehicle body transport direction by the driving unit 243 according to the location of the pillar part of the side assembly 3.

In such a state, the side hanger 210 that restricts the side assembly 3 is transported to the guide post 310 through the first handling robot HR1 in the exemplary embodiment of the present invention.

Then, in the exemplary embodiment of the present invention, the side hangers 210 moves to each of both sides of the floor assembly 2 along the guide post 310 through the first handling robot HR1 and is coupled to the guide post 310.

When such a process is described in more detail, first, in the exemplary embodiment of the present invention, while the side hanger 210 is positioned on the top of the guide post 310 through the first handling robot HR1, the side hanger 210 moves to the top of the guide post 310.

Herein, the locking cylinder 290 of the floating unit 250 separates the locking pin 293 from the pin hole 295 of the third floating plate 259 by the air pressure. Then, the floating unit 250 maintains the state (the unlocking state) in which the second and third floating plates 257 and 259 are movable in the vehicle body transport direction and the vehicle body height direction based on the first floating plate 253.

In the exemplary embodiment of the present invention, the side hanger 210 moves to the top of the guide post 310 through the first handling robot HR1 and the rolling member 221 of the side hanger 210 is positioned at a start portion of the guide rail 351 of the guide post 310.

In such a process, when the location distribution of the side hanger 210 occurs, the side hanger 210 may move in the vehicle body transport direction and the vehicle body height direction through the first to third floating plates 253, 257, and 259 of the first floating unit 250 and the load applied to the first handling robot HR1 in the vehicle body transport direction and the vehicle body height direction may be reduced in the exemplary embodiment of the present invention.

That is, in the exemplary embodiment of the present invention, when the rolling member 221 contacts the rail plane 353 of the guide rail 351 and the load is applied to the rolling member 221 by the location distribution of the side hanger 210, the side hanger 210 may move in the vehicle body transport direction and the vehicle body height direction through the floating unit 250. Since the operation of the floating unit 250 is similar to described above, a more detailed description thereof will be omitted.

After such a process is performed, the side hanger 210 moves in the transverse direction along the guide post 310 through the first handling robot HR1 in the exemplary embodiment of the present invention.

In this case, in the exemplary embodiment of the present invention, a weight of the hanger 210 is supported through the rolling member 221 which rotates while contacting the rail bottom of the guide rail 351 and the side hanger 210 moves in the transverse direction along the guide rail 351.

When the side hanger 210 moves with a predetermined distance in the transverse direction along the guide rail 351 through the first handling robot HR1, the guide pin 227 of the side hanger 210 is coupled to the guide groove 371 of the guide post 310.

Even in this case, the location distribution of the side hanger 210 may occur. Even in this case, the side hanger 210 may move in the vehicle body transport direction and the vehicle body height direction through the first to third floating plates 253, 257, and 259 of the first floating unit 250 and the load applied to the first handling robot HR1 in the vehicle body transport direction and the vehicle body height direction may be reduced in the exemplary embodiment of the present invention.

That is, in the exemplary embodiment of the present invention, when the load is applied to the tapered plane 229 of the guide pin 227, which contacts the pin coupling plane 373 of the guide groove 371 by the location distribution of the side hanger 210, the side hanger 210 may move in the vehicle body transport direction and the vehicle body height direction through the floating unit 250.

In the exemplary embodiment of the present invention, the guide pin 227 of the side hanger 210 may be coupled to the guide groove 371 of the guide post 310 and the side assembly 3 restricted by the side hanger 210 may accurately match each of both sides of the floor assembly 2 in the transverse direction.

Furthermore, in the exemplary embodiment of the present invention, the location distribution of the side assembly 3, which may occur while the first handling robot HR1 handles the side hanger 210 that restricts the side assembly 3 is restricted to minimize the assembly distribution of the side assembly 3 to each of both sides of the floor assembly 2.

Meanwhile, while the side assembly 3 is matching-coupled to each of both sides of the floor assembly 2 as described above, the lower side seal of the side assembly 3 is clamped through the second clampers 381.

Herein, the second clampers 381 may move in the 3-axis direction of the vehicle body transport direction, the vehicle width direction, and the height direction by the driving unit to correspond to the side assemblies 3 different for each vehicle type and clamp the lower side seal of the side assembly 3.

Therefore, in the exemplary embodiment of the present invention, the movement of the side assembly in the vehicle body transport direction and the height direction may be restricted through the side hanger 210 and the second clampers 381 and the lower part 4a of the side assembly 3 may be regularly positioned at each both sides of the floor assembly 2.

In such a state, in the exemplary embodiment of the present invention, the lower part 4a of the side assembly 3 and the floor assembly 2 are welded to each other through the first welding robot 410 and the lower part 3a of the side assembly 3 is pre-assembled to each of both sides of the floor assembly 2.

On the other hand, while the lower part 4a of the side assembly 3 is pre-assembled to each of both sides of the floor assembly 2 through the first welding robot 410, the side hanger 210 is separated from the guide post 310 through the first welding robot 410 in the exemplary embodiment of the present invention.

In this case, the locking cylinder 290 of the floating unit 250 couples the locking pin 293 to the pin hole 295 of the third floating plate 259 by the air pressure. Then, in the exemplary embodiment of the present invention, the second and third floating plates 257 and 259 are regular set to the original location based on the first floating plate 253 and the movement of the second and third floating plates 257 and 259 is impeded. That is, the side hanger 210 returns to the original location before the movement by the floating unit 250.

A series of processes described up to now are performed and while the lower part 4a of the side assembly 3 is pre-assembled to each of both sides of the floor assembly 2 through the prebuck unit 200 in the prebuck section 20, the pre-assembled vehicle body is transported to the main-buck section 50 along the transport path of the cart line 1 in the exemplary embodiment of the present invention.

Then, the vehicle width direction (transverse direction) of the side assembly 3 is restricted through a second handling robot HR2, a side jig 510, a rotary index 610, a CRP loading unit 710, and a second welding robot 810 of the main-buck unit 500 in the main-buck section 50 and an upper part 4b of the side assembly 3 are post-assembled with the vehicle body components such as the cowl 7, the roof rail 8, and the packet tray 9.

By the vehicle body assembling system 100 according to the exemplary embodiment of the present invention, the lower part 4a of the side assembly 3 may be pre-assembled to the floor assembly 2 through the prebuck unit 200 in the prebuck section 20 and the upper part 4b of the side assembly 3 may be post-assembled with the vehicle body components through the main buck unit 500 in the main-buck section 50.

As a result, in the exemplary embodiment of the present invention, a vehicle body assembling process is separated into two processes to assemble vehicle bodies of at least 5 vehicle types or more unlike forming a frame of the vehicle body by a single process.

Accordingly, in the exemplary embodiment of the present invention, multiple vehicle types can be flexibly produced, a facility preparation time can be shortened, weight-lightening and simplification of a whole facility can be achieved, and initial investment cost and investment cost at the time of adding the vehicle type can be reduced.

Furthermore, in the exemplary embodiment of the present invention, as the floating unit 250 is configured in the first handling robot HR1 in the prebuck section 20, the location distribution of the side hanger 210 can be absorbed through the floating unit 250 and the load applied to the first handling robot HR1 in the vehicle body transport direction and the height direction can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A prebuck unit for a vehicle body assembling system having a prebuck section and a main-buck section set along a transport path of a floor assembly, the prebuck unit configured to be used in the prebuck section, the prebuck unit comprising:
    side hangers mounted on a handling robot at both sides of the transport path and configured to restrict a lower part of a side assembly;
    a guide post fixedly installed in a prebuck frame at both sides of the transport path in a vehicle body height direction, the guide post coupled with the side hanger so as to restrict the side assembly in a transverse direction, and being configured to regularly position the side hangers at both sides of the floor assembly; and
    welding robots installed at both sides of the transport path and configured to weld the lower part of the side assembly and the floor assembly.

2. The prebuck unit of claim 1, wherein:
    a first side hanger is coupled with the guide post through the handling robot; and
    a coupling direction of the side hanger and the guide post is a transverse direction as a vehicle width direction that is the same as the coupling direction of the floor assembly and the side assembly.

3. The prebuck unit of claim 2, further comprising a robot hanger restricting the side assembly transported to the prebuck section through a transport hanger and loading the side assembly to the first side hanger.

4. The prebuck unit of claim 1, wherein each side hanger includes:
    a hanger frame mounted on a front end of an arm of the handling robot;
    a reference pin installed in the hanger frame and fitted in a reference hole of the side assembly; and
    a plurality of first clampers installed in the hanger frame and configured to clamp the lower of the side assembly and to restrict a vehicle body transport direction and a height direction of the side assembly.

5. The prebuck unit of claim 4, wherein the first clampers are disposed in the hanger frame in a triangular structure.

6. The prebuck unit of claim 4, wherein the side hanger includes rolling members rollably installed below both ends of the hanger frame, and guide pins installed on tops of the rolling members to protrude in the transverse direction at both ends of the hanger frame.

7. The prebuck unit of claim 6, wherein each rolling member includes guide rollers rotatably installed below both ends of the hanger frame in the transverse direction.

8. The prebuck unit of claim 7, wherein each guide roller is provided rotatably in the transverse direction while line-contacting the top of the guide post.

9. The prebuck unit of claim 7, wherein each guide roller is provided rotatably in the transverse direction while point-contacting the top of the guide post.

10. The prebuck unit of claim 9, wherein each guide roller has a rolling plane having a mountain shape, which point-contacts the top of the guide post.

11. The prebuck unit of claim 6, wherein the rolling members include guide balls installed below both ends of the hanger frame to be rotatable omnidirectionally.

12. The prebuck unit of claim 6, wherein each guide pin has a tapered plane at a protruded portion thereof.

13. The prebuck unit of claim 4, wherein:
each side hanger includes rolling members rollably installed below both ends of the hanger frame; and
the guide post includes a pair of post frames installed on the prebuck frame to be spaced apart from each other and having guide rails guiding rolling members formed on top in the transverse direction.

14. The prebuck unit of claim 13, wherein the side hanger includes guide pins installed on the tops of the rolling members to protrude in the transverse direction at both ends of the hanger frame, and guide grooves coupled with the guide pins are formed at the ends of the guide rails in the post frame.

15. The prebuck unit of claim 14, wherein:
the guide pin has a tapered plane at a protruded portion thereof;
the guide rail has a rail plane inclined toward a rail bottom of the guide rail at both sides; and
the guide groove has a pin coupling plane connected with the rail plane.

16. The prebuck unit of claim 1, wherein, in the prebuck frame, a plurality of second clampers for clamping a lowermost end of the side assembly is installed apart from the side hanger while the side hanger is coupled to the guide post.

17. A prebuck unit for a vehicle body assembling system having a prebuck section and a main-buck section set along a transport path of a floor assembly, the prebuck unit being configured in the prebuck section and comprising:
side hangers mounted on a front end of an arm of a handling robot at both sides of the transport path and restricting lower parts of side assemblies;
a floating unit installed at the front end of the arm of the handling robot and provided to move in a vehicle body transport direction and a height direction;
a guide post fixedly installed in a prebuck frame at both sides of the transport path in a vehicle body height direction, the guide post coupled with the side hanger restricting the side assembly in a transverse direction, and configured to regularly position the side hanger at both sides of the floor assembly; and
a welding robot installed at both sides of the transport path and welding the lower part of the side assembly and the floor assembly.

18. The prebuck unit of claim 17, wherein the floating unit includes:
a first mounting plate mounted at the front end of the arm of the handling robot;
a first floating plate coupled to the first mounting plate;
a second mounting plate coupled with the side hanger;
a second floating plate coupled to the second mounting plate; and
a third floating plate disposed between the first floating plate and the second floating plate and coupled to the first and second floating plates, wherein the first and third floating plates are provided to move in the vehicle body transport direction through the second floating plate and the second and third floating plates are provided to move in the vehicle body height direction through the first floating plate.

19. The prebuck unit of claim 18, wherein the floating unit includes:
a first stopper installed in the first and third floating plates and configured to restrict vehicle body height-direction movement ranges of the second and third floating plates; and
a second stopper installed in the second and third floating plates and configured to restrict vehicle body transport-direction movement ranges of the first and third floating plates.

20. The prebuck unit of claim 18, wherein the floating unit includes a locking cylinder having a locking pin installed in the first floating plate to move in the transverse direction through air pressure between the first and third floating plates and selectively coupling the locking pin to a pin hole at the center of the third floating plate.

* * * * *